Oct. 3, 1933.   O. U. ZERK   1,928,919
UNIVERSAL JOINT FOR TIE RODS AND THE LIKE
Filed April 12, 1932
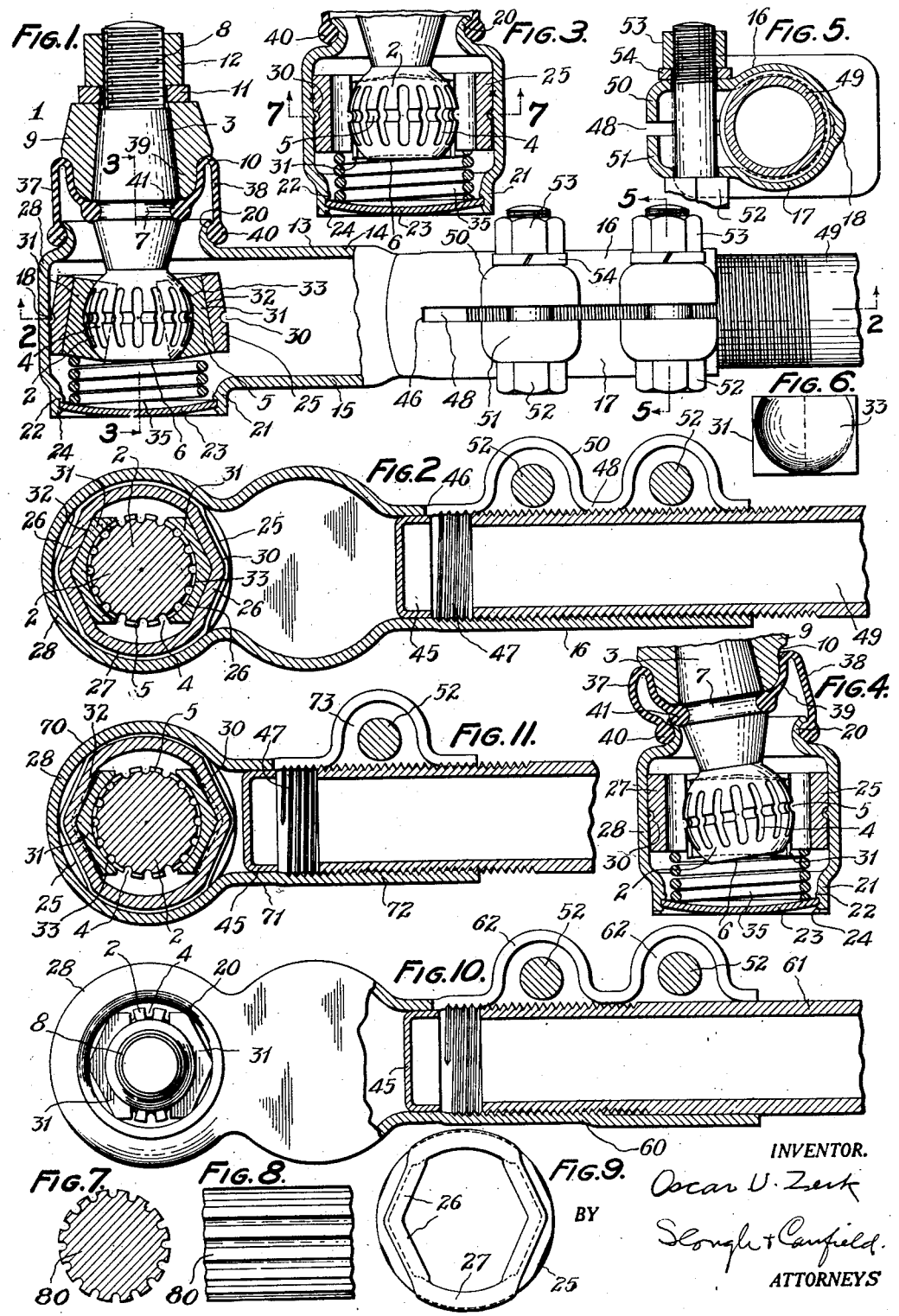
INVENTOR.
Oscar U. Zerk
BY
Slough & Canfield
ATTORNEYS Patented Oct. 3, 1933

1,928,919

UNITED STATES PATENT OFFICE 1,928,919

UNIVERSAL JOINT FOR TIE RODS AND THE LIKE

Oscar U. Zerk, Cleveland, Ohio

Application April 12, 1932. Serial No. 604,779

8 Claims. (Cl. 287—90)

My invention relates to universal joints and relates more particularly to tie rod or drag link joints, such as used in automobile steering mechanisms, although my invention is not limited to such use.

My invention further relates to universal joints of the ball and socket type wherein the wear between relatively movable ball and socket elements of the joint is automatically compensated for by effecting a wedging action between converging surfaces of elements of the joint, to take up for the wear.

Such universal joint constructions have been employed in universal joints of the type above referred to, but it has been found that the converging surfaces of the ball joint parts require expensive machining operations, especially where said converging surfaces are interior surfaces of the ball and socket joint housing, which is usually made of malleable steel casting.

An object of my invention, therefore, is to provide an improved ball and socket joint applicable to tie rod or drag link joints of an automotive steering linkage, wherein the wedging surfaces required to effect compensation for wear occurring in the joint, may be provided less expensively than in the mechanisms of the prior art seeking to accomplish the same general purposes.

Another object of my invention is to provide an improved ball and socket joint suitable for tie rod and drag link joints of an automotive steering mechanism, or applicable to like uses, which may be effectively manufactured embodying a construction wherein the housing may be formed from sheet metal without requiring expensive machining operations.

Another object of my invention is to provide an improved universal joint applicable to the linkage of an automotive steering mechanism wherein compensation for wear may be automatically effectively accomplished and wherein friction between the relatively movable ball and socket parts of the joint may be very substantially reduced or reduced to a very highly desirable minimum value.

Another object of my invention is to provide an improved ball and socket joint having improved means for compensating for wear of the relatively moving elements thereof.

Another object of my invention is to provide a relatively inexpensive wear compensating universal joint of the ball and socket type.

Another object of my invention is to provide an improved ball and socket joint casing which may be sealed against the ingress of dust and dirt and the egress of lubricant and supporting bearing elements of said joint in proper wear compensating relation.

Other objects of my invention and the invention itself will be more apparent to those skilled in the art to which my invention appertains by reference to the accompanying drawings illustrating my invention embodied in specific mechanism, and to the accompanying description of the mechanisms described in the drawing.

Referring to the drawing:—

Fig. 1 is a view partly in longitudinal medial section and partly in elevation of the ball and socket joint embodying my invention;

Fig. 2 is a longitudinal section taken on the line 2—2 of Fig. 1;

Fig. 3 is a section taken on the line 3—3 of Fig. 1;

Fig. 4 is a view like that of Fig. 3 but with the parts shown in relatively different operative positions;

Fig. 5 is a section taken on the line 5—5 of Fig. 1;

Fig. 6 is an elevational view of a ball engaging shoe which I may employ;

Fig. 7 is a sectional view of a grooved shaft from which the ball element of the joint is formed;

Fig. 8 is a side elevational view of the grooved rod illustrated in Fig. 7;

Fig. 9 is a plan view of a ball supporting element which I may employ;

Fig. 10 is a plan view partially in elevation and partially in section of a modification of my invention; and, Fig. 11 is a horizontal sectional view of another modification of my invention.

Referring to Figs. 1 to 9 inclusive, wherein I show a preferred embodiment of my invention, a ball element generally indicated at 1 comprises a generally spherical head 2 and a shank 3. The ball element 1 is formed of a rod 80 illustrated in Figs. 7 and 8 which is provided with spaced longitudinal grooves, generally semi-circular in cross section. The rod 80 is machined to the shape illustrated in Fig. 1 preferably by screw machine operations wherein the ball 2 is provided with spaced radially extending grooves 4 and a substantially circumferentially extending groove 5 and is preferably flatted as indicated at 6.

The shank 3 of element 1 progressively increases in diameter from the ball to a circular groove 7 thence progressively decreasing in diameter to a reduced threaded end 8. An eye 9 of the steering arm of a vehicle steering mechanism provided with a circular shoulder 10 is secured to the shank by a washer 11 and a nut 12 which threadedly engages the end 8 of the shank 3.

A casing 13 more fully described in my copending application, Serial No. 604,781 filed, Apr. 12, 1932 comprises cup sections 14 and 15 provided with integral internally threaded clamping jaws 16 and 17, weldingly secured together along their abutting edges as indicated at 18. The section 14 is provided with a circumferentially grooved collar 20 coaxial with ball element 1 and the cup section 15 is provided with a collar 21 recessed to provide a circular shoulder 22 against which a dished circular plate 23 is sealingly secured by flanging over spaced peripheral portions of the collar 21, as indicated at 24.

Prior to butt-welding the cup sections 14 and 15 together a tapered ring 25 is secured to the cup section 15 preferably by spot welding. The ring 25 is provided with similar converging walls 26 and intermediately spaced curved walls 27 and is adapted to tightly engage a generally circular end 28 of the cup section 15. The ring 25 does not engage the cup section 14 thereby eliminating any danger of short-circuiting therethrough during the welding operation. The ring 25 is preferably provided with a circular groove 30 substantially in the plane of the abutting spaces of the cup sections 14 and 15 adapted to provide clearance for flash generated during the welding process.

Shoes 31 generally V-shaped in cross section are provided with outer converging faces 32 adapted to engage the walls 26 of ring 25 and an inner partially spherical recessed face 33, best illustrated in Fig. 6, adapted to engage opposite sides of ball 2 of element 1.

A normally compressed spring 35 engages the shoes 31 and seats upon the dished plate 23.

As the ball 2 and the shoes 31 become worn, the shoes 31 which slidingly engage the tapered faces 26 of ring 25 will be forced convergently upward by the action of spring 35, thus taking up any play which might otherwise occur between the bearing elements. By providing a dished seat such as plate 23 for the spring 35, the shoes 31 will always be returned to a normal position when removed therefrom by an extreme movement of element 1 due to the self-centering tendency of spring 35 relative to its seat 23. Since the shoes 31 slidingly engage the faces 26 of ring 25 and can be moved relatively upwardly or downwardly, and also engage the surface of ball 2 slidingly in any direction, a universal movement may be effected relative to the casing without any tendency to bind.

In order to seal the casing at the point where the shank 3 of bearing element 1 protrudes therefrom I provide a resilient sealing element 37, preferably formed of synthetic rubber, which comprises a normally cylindrical portion 38 and a reentrant portion 39. The portion 38 is provided with a ring substantially cylindrical in cross section which constrictingly engages the collar 20 of the casing and the re-entrant portion 39 is provided with a similar collar 41 which constrictingly engages the shank 3 at the recess 7 provided therein.

As is most clearly illustrated in Fig. 4, the element 1 is thus effectively sealed relative to the casing, irrespective of the operative position which it may occupy. I prefer that the sealing element 37 be formed of synthetic rubber inasmuch as this rubber is considerably more resistant to the deteriorating effects of lubricants and the like than natural rubber.

I provide a cap 45 which is sealingly secured in a throat 46 of the casing preferably after the cup sections 14 and 15 have been secured together, and also after the inner wall of the throat has been suitably machined to remove any internally disposed flash created during the welding process, thus ensuring a tight joint between the cap and the throat.

I preferably employ a resilient, threaded plug 47 prior to and during the welding operation to ensure that the threads of the clamping jaws 16 and 17 will be in proper alignment.

A slot indicated at 48 is provided whereby the necessary tension can be exerted by the clamping jaws upon a threaded tie rod 49 or the like disposed therein. To effect this clamping tension I provide spaced generally box-shaped clamping lugs 50 integral with jaw 16, and lugs 51 integral with jaw 17. The clamping lugs 50 and 51 are provided with aligned apertures within which are disposed bolts 52 and which are lockingly secured therein by nuts 53 and lock washers 54. The tie rod 49 can thus be adjusted to any desired position and securely locked by means of the clamping lugs.

The casing and associated parts being generally tubular or box-shaped in construction provide relatively great strength per unit of weight and inasmuch as the parts are susceptible of being formed by relatively inexpensive stamping and screw machine operations and of assembly by welding, a relatively inexpensive universal joint and casing is provided. The bearing elements are effectively sealed against the ingress of foreign substances which might have an abrasive tendency between the bearing elements and a sufficiently large chamber is provided in the casing to act as a lubricant reservoir if desired. The radial grooves 4 and transverse groove 5 in the ball 2 provide an effective means to ensure that lubricant will reach the relatively movable bearing elements.

Referring to Fig. 10 I show a modification of my invention which is generally similar to that shown and described in Figs. 1 to 9 but wherein only a portion of the clamping jaws are threaded as indicated at 60 and the remaining portion is flared outwardly to a diameter slightly greater than the external diameter of a tie rod tube or the like 61 clamped thereby. In this modification the outwardly disposed clamping lug 62 will therefore engage a substantially non-threaded portion of the rod 61. This construction eliminates the necessity of stamping or otherwise providing threads throughout the entire length of the clamping jaws.

In Fig. 11 I have illustrated another modification of my invention wherein the universal joint elements are similar to those described in connection with Figs. 1 to 9 but wherein the casing chamber is relatively reduced and comprises a generally circular end wall 70, a throat portion 71 and clamping jaws generally indicated at 72. In this modification the clamping jaws 72 are relatively shortened and provided with only one clamping lug 73 on each jaw rather than two as hereinbefore described. A cap 45 is secured within the casing throat 71 as previously described, and a resilient plug 47 is preferably provided for reasons hereinbefore described.

The shoes 31 in this modification normally do not engage the faces 26 of ring 25 along the whole surface thereof but only along the line at the apex of the dihedral angle formed therebetween, thus permitting lateral adjustment in addition to vertical adjustment to compensate for wear between shoes 31 and head 2.

I prefer that the threads provided in the clamping jaws be stamped therein and furthermore that less than a full thread be provided thereby enabling a relatively thinner gauge metal to be used, requiring materially less pressure to effect the stamping operation, and to provide a slight clearance between the inner engaging threads of the rod and the clamping jaws for metal which may be raised therebetween. I also prefer that all surfaces which are butt-welded together should be of substantially the same area in order that the welding heat generated may be radiated at a substantially even rate, thereby effecting a uniform weld and a most efficient use of welding current.

Although I have shown and described modifications of my invention I contemplate that numerous and extensive departures may be made therefrom without departing from the spirit and scope of my invention and the appended claims. Having thus described my invention what I claim is:—

1. In a ball and socket universal joint, a casing having an opening, opposite converging guideways in the casing, a ball element in the casing provided with a stem projected through said opening, said guideways extending substantially longitudinally with respect to said stem, bearing blocks simultaneously reciprocable on the guideways to cause them to approach and/or to recede from each other, said bearing blocks jointly embracing the ball of said ball element and the blocks and guideways mutually engaging on transversely concavo-convex portions, said guideways comprising inner walls extending transversely divergingly from outer opposing walls of said blocks.

2. In a ball and socket universal joint, a casing comprising elongated sheet metal stampings of generally channeled form integrally weldedly joined together at their lateral edges and each provided with an end wall abuttingly welded to the end wall of the other casing, opposite converging guideways in the casing, said guideways disposed in the end of the casing nearest the joined end walls, a ball element in the casing provided with a stem projected through said opening, bearing blocks reciprocable on the guideways from and toward the opening to simultaneously cause them to approach and/or to recede from each other, said bearing blocks jointly embracing the ball of said ball element.

3. In a ball and socket universal joint, a casing comprising elongated sheet metal stampings of generally channeled form integrally weldedly joined together at their lateral edges and each provided with an end wall abuttingly welded to the end wall of the other casing, opposite converging guideways in the casing, said guideways disposed in the end of the casing nearest the joined end walls, a ball element in the casing provided with a stem projected through said opening, bearing blocks reciprocable on the guideways from and toward the opening to simultaneously cause them to approach and/or to recede from each other, said bearing blocks jointly embracing the ball of said ball element, a tube rigidly secured within the walls of the casing, said guideways provided by oppositely disposed interior walls of the tube, said tube provided with an enlarged waist and secured to said casing walls by welding its waist portion to the weld seam between the casing halves.

4. The joint substantially as described in claim 1, characterized by the provision of spring means in the casing urging movement of said blocks in a direction substantially longitudinally of the ball stem on the guideways.

5. In a ball and socket universal joint, a casing having an opening, opposite converging guideways in the casing, a ball element in the casing provided with a stem projected through said opening, bearing blocks simultaneously reciprocable on the guideways to cause them to approach and/or to recede from each other, said bearing blocks jointly embracing the ball of said ball elements and the blocks and guideways mutually engaging on transversely concavo-convex portions, said blocks engaging said guideways substantially only upon intermediate longitudinal portions thereof and laterally rockable relative to each other.

6. In a ball and socket universal joint, a casing having an opening, opposite converging guideways in the casing, a ball element in the casing provided with a stem projected through said opening, bearing blocks simultaneously reciprocable on the guideways to cause them to approach and/or to recede from each other, said bearing blocks jointly embracing the ball of said ball element and the blocks and guideways mutually engaging on transversely concavo-convex portions, a guide tube rigidly secured within the casing aligned with the opening, said guideways formed on the inner surfaces thereof, and having relatively angularly disposed portions with a plurality of which each block makes sliding contact.

7. In a ball and socket universal joint, a casing having an opening, opposite converging guideways in the casing, a ball element in the casing provided with a stem projected through said opening, bearing blocks simultaneously reciprocable on the guideways to cause them to approach and/or to recede from each other, said bearing blocks jointly embracing the ball of said ball element and the blocks and guideways mutually engaging on transversely concavo-convex portions, a tube rigidly secured within the walls of the casing, said guideways provided by oppositely disposed interior walls of the tube, and each comprising a pair of laterally divergent walls.

8. In a ball and socket joint in combination with a casing, a ball element projected through an opening of the casing to position a bearing ball end thereof within the casing, ball engaging socket elements embracing said ball, guides for the blocks having relatively converging inner walls, said blocks adapted to laterally rockingly fulcrum by outer longitudinally extending intermediate portions on said guides, and spring means resiliently urging said socket elements longitudinally of said ball element on said guides, said guides comprising portions restraining rotational lateral movements of the socket elements with said ball relative to said guides.

OSCAR U. ZERK.